(12) United States Patent
Srinivasan et al.

(10) Patent No.: US 10,733,359 B2
(45) Date of Patent: Aug. 4, 2020

(54) EXPANDING INPUT CONTENT UTILIZING PREVIOUSLY-GENERATED CONTENT

(71) Applicant: ADOBE INC., San Jose, CA (US)

(72) Inventors: Balaji Vasan Srinivasan, Bangalore (IN); Rishiraj Saha Roy, Homburg (DE); Niyati Chhaya, Pune (IN); Natwar Modani, Bengaluru (IN); Harsh Jhamtani, Kanpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/248,675

(22) Filed: Aug. 26, 2016

(65) Prior Publication Data

US 2018/0060287 A1    Mar. 1, 2018

(51) Int. Cl.
*G06F 40/131* (2020.01)
*G06F 16/335* (2019.01)
*G06F 40/169* (2020.01)
*G06F 40/284* (2020.01)

(52) U.S. Cl.
CPC .......... *G06F 40/131* (2020.01); *G06F 16/335* (2019.01); *G06F 40/169* (2020.01); *G06F 40/284* (2020.01)

(58) Field of Classification Search
None
See application file for complete search history.

(56) References Cited

U.S. PATENT DOCUMENTS 8,392,390 B2 * 3/2013 Bennett ................. G06F 17/274
707/705
8,612,213 B1 * 12/2013 Zhai ........................ G06F 17/24
704/251
8,838,583 B1 * 9/2014 Fox ..................... G06Q 30/0207
707/723
9,390,139 B1 * 7/2016 Bhattacharjee ..... G06F 17/3053
9,602,559 B1 * 3/2017 Barros .................. H04L 65/403
10,423,999 B1 * 9/2019 Doctor ............... G06Q 30/0631
2005/0246328 A1 * 11/2005 Zhang ................. G06F 16/9535

(Continued)

OTHER PUBLICATIONS

Carbonell, J., & Goldstein, J. (Aug. 1998). The use of MMR, diversity-based reranking for reordering documents and producing summaries. In Proceedings of the 21st annual international ACM SIGIR conference on Research and Development in information retrieval (pp. 335-336). ACM.

(Continued)

*Primary Examiner* — Howard Cortes
(74) *Attorney, Agent, or Firm* — Shook, Hardy & Bacon L.L.P.

(57) ABSTRACT

Systems and methods provide for expanding user-provided content. User-provided input content is received via a user interface. Content that is relevant to the user-provided input content is identified from a repository of previously-generated content. The identified relevant content is divided into content sub-segments. From the content sub-segments, one or more pieces of candidate content are identified based on each content sub-segment's relevance to the received input content. At least one piece of identified candidate content is provided for display. A selection of one or more pieces of identified candidate content is received, such that the selected piece(s) of identified candidate content is appended to the received input content, thereby expanding the user-provided content.

13 Claims, 8 Drawing Sheets

(56) References Cited

U.S. PATENT DOCUMENTS

| | | | | |
|---|---|---|---|---|
| 2007/0276829 | A1* | 11/2007 | Wang | G06F 17/30663 |
| 2008/0154878 | A1* | 6/2008 | Rose | G06F 17/30867 |
| 2008/0195571 | A1* | 8/2008 | Furuuchi | G06F 17/276 |
| | | | | 706/56 |
| 2008/0320411 | A1* | 12/2008 | Chen | G06F 17/276 |
| | | | | 715/780 |
| 2009/0164426 | A1* | 6/2009 | Kirovski | G06F 17/30675 |
| 2010/0070908 | A1* | 3/2010 | Mori | G06F 3/0237 |
| | | | | 715/773 |
| 2010/0293447 | A1* | 11/2010 | Kadowaki | G06F 17/2755 |
| | | | | 715/201 |
| 2013/0103672 | A1* | 4/2013 | Parikh | G06F 17/30867 |
| | | | | 707/717 |
| 2013/0212475 | A1* | 8/2013 | Lee | G06F 17/276 |
| | | | | 715/261 |
| 2015/0127591 | A1* | 5/2015 | Gupta | G06N 5/04 |
| | | | | 706/12 |
| 2016/0048575 | A1* | 2/2016 | Shoham | G06F 17/30867 |
| | | | | 707/728 |
| 2016/0103875 | A1* | 4/2016 | Zupancic | G06F 17/27 |
| | | | | 707/773 |
| 2017/0109411 | A1* | 4/2017 | Daya | G06F 17/30554 |

OTHER PUBLICATIONS

Modani, N., Khabiri, E., Srinivasan, H., & Caverlee, J. (Nov. 2015). Creating diverse product review summaries: a graph approach. In International Conference on Web Information Systems Engineering (pp. 169-184). Springer, Cham.

* cited by examiner

US 10,733,359 B2

EXPANDING INPUT CONTENT UTILIZING PREVIOUSLY-GENERATED CONTENT

BACKGROUND

In order to attract and maintain consumer engagement, content authors need to generate new and interesting content for their audience. To provide fresh content and maintain high user engagement, authors can produce new content, or in the alternative, can gain inspiration from existing content. There are, however, inherent inefficiencies in both methodologies. Authoring content from scratch can be an ineffective use of time and resources, and the ability to effectively produce robust content while keeping up with demand may be difficult. To this end, authors oftentimes lean on existing content for inspiration. Unfortunately, the author's reliance on existing content requires that an extensive amount of research be performed, and irrelevant information be eliminated from consideration. This generally time-consuming and archaic approach to generate new or fresh content can be inefficient and untimely.

SUMMARY

Embodiments of the present invention are directed to facilitating automated content reuse to expand content delivered to authoring users. Automated reuse of existing content or existing content fragments enables efficient creation of new or expanded content. In this regard, input content, for example, provided by an author, is expanded using previously generated content. In implementation, embodiments of the present invention are directed towards both identifying and retrieving content relevant to input content as well as creating new meaningful content. For example, given a set of keywords, sentence fragments, or a few sentences as new input content, pre-existing content can be identified and retrieved, from a repository for instance, and then meaningfully integrated into the new content. Reusing smaller, existing content fragments to generate new content can create fresh content for delivery to users, thereby increasing or maintaining user engagement. In implementation, a content expansion system can be used to expand input content received from a user based on previously-generated content. The input content can take any number of forms and can be, for example, one or more keywords, sentence fragments, sentences, paragraphs, and so on. Based upon the input content, the content expansion system can construct a query to identify and/or retrieve relevant content from a repository of previously created or generated content. Once relevant content is identified and/or retrieved, the content expansion system can clean the data, for example, by dividing the identified relevant content into sub-segments and/or discarding less relevant sub-segments or sub-segments that are too short in length. Based on the relevancy of the cleaned content and/or the diversity of the cleaned content, the content expansion system can then identify candidate content to be used in content expansion. The candidate content can be output to a user to utilize in expanding the input content. The candidate content can be output in any form such that the user is able to select any combination of identified candidate content for use.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-8 illustrate an embodiment of the present invention and in which:

FIG. 1 provides a schematic diagram showing an exemplary content expansion system, in accordance with some implementations of the present disclosure;

FIG. 2 provides a flow diagram showing a content expansion process, in accordance with some implementations of the present disclosure;

FIG. 5 provides an illustrative process flow depicting a method for expanding input content, in accordance with some implementations of the present disclosure;

FIG. 6 provides an illustrative process flow depicting a method for constructing input queries for utilization in content expansion, in accordance with some implementations of the present disclosure;

FIG. 7 provides an illustrative process flow depicting a method for composing pieces of candidate content to selectively expand input content, in accordance with some implementations of the present disclosure; and FIG. 8 provides a block diagram of an exemplary computing device in which some implementations of the present disclosure may be employed.

DETAILED DESCRIPTION

Figure 1:
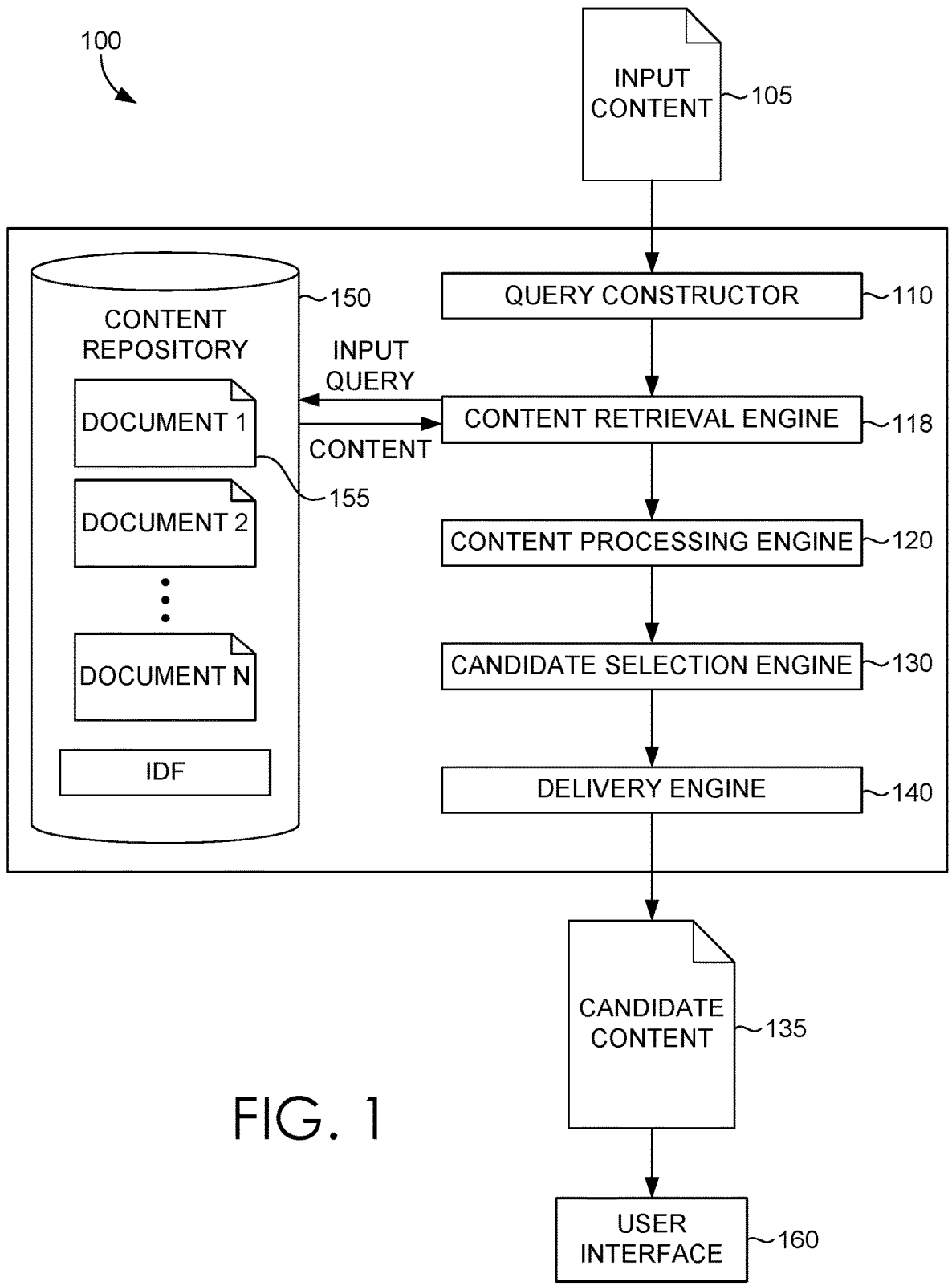

The ability to quickly generate high-quality, relevant content for a consumer is an important aspect in maintaining consumer engagement in, for example, electronic media outlets. To generate relevant content in an effort to maintain high user engagement, authors creatively produce new content or gain inspiration from existing content. While utilizing existing content to expand and generate new content is generally more efficient that creating new content from scratch, authors are currently manually using existing content to generate the new and fresh content. For instance, an author may employ traditional methods that search for relevant pre-existing content. The author must then subsequently review the relevant content encountered by way of the search, to identify the portions that are relevant to his content generation. Authoring content in this way is clearly an ineffective use of time and resources. In some instances, authors can also rely on content summarization algorithms that generate high level summaries of retrieved content based on a given input query. Unfortunately, content summarization does not account for areas of overlap in relevant pre-existing content. To this end, authoring tools that optimize content expansion or, in other words, facilitate the creation of relevant and diverse content, are highly desirable.

As such, embodiments of the present invention are directed towards building new content by automating the identification, retrieval, and refinement of pre-existing content based on an author's input content, to facilitate the construction of expanded content that is both relevant and diverse to the received input content. In particular, based on input content, embodiments of the present invention can identify relevant content and assemble or combine such relevant content in a way to create a new, fresh document. In certain embodiments, there is provided a method to automatically expand (e.g., supplement, grow, elaborate) user provided content by utilizing content obtained from a repository and subsequently processed for relevance and diversity, among other things. In this way, an author can leverage pre-existing content that is relevant to the content being generated, and build upon currently-authored content by integrating unique and relevant portions of pre-existing content, or modifications thereof. In sum, unique and robust new content can be created by identifying and using both relevant and diverse content to optimize content generation.

New content is composed such that it is relevant to a topic or genre specified by an author. New content can be composed or generated by leveraging keywords, one or more sentence fragments, one or more sentences, or short text snippets created or input by an author. A content expansion system according to embodiments of the invention disclosed herein may construct a query from an input or user-provided content. The content expansion system can then identify and retrieve relevant content from one or more content repositories. Moreover, the content expansion system can refine the retrieved relevant content, so that the potential entries for expanding the content (hereinafter referred to as "candidate content") are of appropriate length and diversity. The content expansion system can present candidate content to an author to selectively supplement his input content, and gradually build new content. In accordance with embodiments described herein, identified candidate content is both relevant and diverse to the author's input content, such that the expanded content is devoid of redundancies.

FIG. 1 depicts aspects of a content expansion system 100 in accordance with various embodiments of the present disclosure. The content expansion system 100 can include a plurality of engines or modules, including but not limited to: a query constructor 110, a content retrieval engine 118, a content processing engine 120, a candidate selection engine 130, and a delivery engine 140. As depicted, the content expansion system 100 comprises a content repository 150, which can also be a plurality of content repositories that is in operable communication with any of the engines or modules. A content repository can be a storage device or database configured to contain or host a plurality of documents 155. The content expansion system 100 can obtain input content 105 from a user (e.g., via a user interface) or, alternatively, be obtained from another external system or engine via an interface.

Utilizing obtained input content 105, the content expansion system can create an input query defined by a query constructor 110. The query constructor 110 can create the input query as a search query including one or more parameters that are based on the input content 105. In accordance with embodiments described herein, the input content 105 can include one or more words, sentences, quotes, phrases, paragraphs, and the like. In various embodiments, the query constructor 110 can create the input query utilizing any portion or the entirety of the obtained input content 105.

A content retrieval engine 118 can identify and subsequently retrieve relevant content in a repository (e.g., content repository 150). The repository can contain a plurality of previously-generated content 155 (e.g., articles, blog entries, wikis, webpages, forums, encyclopedias, dictionaries, newscasts, social media, etc.), which may be aggregated in the repository from one or more sources, including interfaces with other systems (e.g., internal or external) or user-input content.

The identified and retrieved relevant content can subsequently be divided into content segments or content sub-segments by a content processing engine 120. In various embodiments, the content processing engine 120 can refine, or in other words, clean the identified and retrieved content by trimming it down in preparation for use in content expansion. In other words, the identified content can be split into smaller units (i.e., content segments or content sub-segments), including paragraphs, sentences, quotations, lines, and the like.

The content expansion system 100 can further identify one or more pieces of candidate content 214 from the content segments or content sub-segments 210 via a candidate selection engine 130. Candidate content 135 can be identified by a candidate selection engine 130 based on, among other things, a relevancy of the content segments or content sub-segments to the input content 105 and a diversity of the content segments or content sub-segments to one another.

As referenced herein, relevancy between content segments or content sub-segments can be determined based at least in part on a contextual likeness thereof to the input content 105. In other words, and in accordance with some embodiments, a comparison made between a content segment or sub-segment with the input content 105 can generate a relevancy score where a higher similarity results in a higher relevancy score, and a lesser similarity results in a lower relevancy score. In some other embodiments, machine learning techniques can be employed to determine a relevancy score based on a calculated relevance of a content segment or sub-segment in light of an input content 105.

In another aspect, the candidate selection engine 130 can identify candidate content 135 based further on determined diversity between the content segments and/or sub-segments. That is, the candidate selection engine 130 can ensure that no two pieces of candidate content 135 are alike, so that the candidate content 135 that is identified and provided for output (e.g., to a user) are both relevant to the input content 105 and diverse to one another.

Once candidate content, that is both relevant and diverse, is identified by the content expansion system 100, the candidate content can be output, via a delivery engine 140, to the user (e.g., via a user interface), thereby enabling the user to select any number of pieces of output candidate content for use in expanding, or in other words supplementing, the input content 105. The candidate content 135 can be presented to the user by a selection interface comprising a list, checkboxes, menus, and the like. The user can then select which piece of the candidate content 135, if any, can be used in expanding, or otherwise supplementing, the input content 105.

Figure 2:
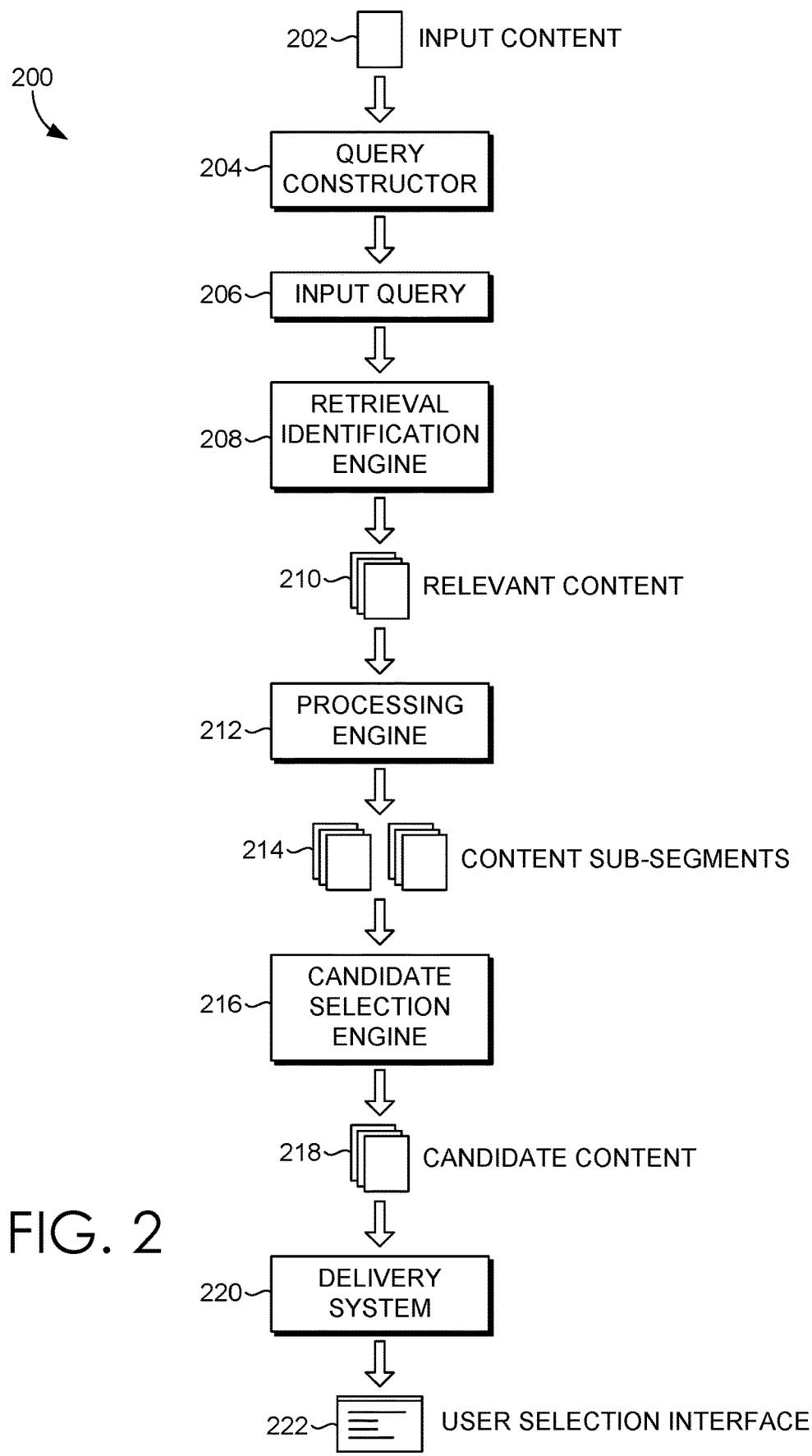

Looking now to FIG. 2, FIG. 2. depicts a workflow diagram 200 illustrating aspects of a content expansion system in accordance with various embodiments of the present disclosure. The content expansion system can include a query constructor 204, a content retrieval engine 208, a content processing engine 212, a candidate selection engine 216, and a delivery engine 220.

As depicted, the content expansion system receives input content 202. Input content can be obtained from a user of the content expansion system, or can be obtained in any other suitable manner. Input content 202 can take various forms including, but not limited to: one or more keywords, one or more sentence fragments including a few key phrases, one or more sentences and the like. The input content 202 can be in any suitable format (e.g., a text box of an electronic form, a word processing document, etc.).

The input content 202 (e.g., input content 105 of FIG. 1) can be communicated to a query constructor 204, such as query constructor 110 of FIG. 1. For example, a user provides input content 202 (e.g., input via a keyboard or loaded via a memory device) to a user interface, the input content 202 including a few keywords, text snippets, or the like. The input content 202 is then communicated via the user interface to the query constructor 204, where the query constructor 204 analyzes the input content 202. Based on characteristics (e.g., content, length, format, origin, language, etc.) of the input content 202 received by the content expansion system 200, the query constructor 204 may extract one or more keywords from the input content 202 to be used in the content retrieval process.

After the one or more keywords are extracted from the input content 202, the query constructor then ranks those extracted keywords based on a "degree of importance" that is associated with each of the keywords to produce a list of ranked keywords. In various embodiments, a user-defined or system-defined set of top keywords may be used by the query constructor 204 to construct an input query 206 for retrieving relevant content from a repository, such as content repository 150 of FIG. 1. Identifying relevant content from the content repository can be based on a list of ranked keywords. The degree of importance associated with each keyword can be based on an importance score or criteria, for example an inverse document frequency (IDF) score for each of the keywords in the content repository. The importance score can take the form of a numerical statistic which reflects the importance of a word to a document or a set of documents.

In one embodiment, the query constructor 204 uses the inverse document frequency (IDF) score in the repository as the "degree of importance" for a given keyword. IDF is a statistical measure of how often each term appears in one or more fields of all documents in the content repository. It will be appreciated that with respect to an IDF score, the more often a term appears in an index, the less relevant it becomes, and further terms that appear in many documents will have a lower weight than more uncommon terms. Utilizing one or more of the keywords from the list of ranked keywords, an input query 206 can be constructed by the query constructor 204 and utilized to identify and obtain relevant content from the content repository. The one or more keywords can be selected by the query constructor 204 based on a relevance threshold, defined by a user or the system. An input query 206 can be generated by the query constructor 204 utilizing those keywords meeting or exceeding the relevance threshold.

Utilizing a constructed input query 206, the content expansion system 200 can now identify and retrieve relevant content 210. Identification and retrieval can be facilitated through the use of a content retrieval engine 208, such as retrieval engine 118 of FIG. 1, that is in operable communication with the content repository. The relevance threshold utilized to build the input query 206 can be further utilized by the content retrieval engine 208 when identifying relevant content within the content repository.

In some embodiments, a relevance score is used by the content retrieval engine 208 to identify and return relevant content. For example, a term frequency/inverse document frequency (TF/IDF) algorithm can be utilized to identify the relevant content 210 from the content repository. In this example, TF is a statistical measurement of how often a term appears within a given document, i.e. the more often a term appears the more relevant a document is. As previously mentioned, IDF is a statistical measurement of how often a term appears across the index of documents; with respect to IDF, the more often a term appears the less relevant it becomes as terms that appear in many documents will have a lower weight than those with uncommon terms. Other factors that might be utilized by the content retrieval engine 208 can include, but are not limited to, field-length norm, term proximity, and term similarity.

After obtaining the relevant content, the content expansion system can return and store the relevance score for each piece of relevant content identified and/or retrieved. The relevance score can thus identify, to which degree the relevant content identified is relevant to the input query 206. For example, the input query 206 can be used by the content retrieval engine 208 to retrieve relevant content articles from the content repository, and for each article or piece of content returned, its relevance score can also returned and stored.

Content that has been identified and retrieved as relevant content 210 by the content retrieval engine 208 of the content expansion system can be passed to a content processing engine 212, such as, processing engine 120 of FIG. 1. Such a processing step can be used to, in essence, refine or clean the identified and/or retrieved content by trimming it down and preparing it for use in content expansion. In other words, identified content can further be split into units. For example, identified articles can be split into suitable text units. In other words, the identified relevant content 210 can be divided into content segments or content sub-segments 214, which can be, for instance, paragraphs or sentences. In some embodiments content segments or sub-segments that do not meet a user-defined or system-defined threshold are discarded by the content processing engine 212. The content processing engine 212 may further associate each text unit with a relevance score to the input query 206.

Once the identified relevant content is cleaned and processed into content segments or sub-segments 214, one or more pieces of candidate content 218 can be identified by a candidate selection engine 216, such as candidate selection engine 130 of FIG. 1. The candidate selection engine 216 identifies and selects content from the group of cleaned content segments or sub-segments 214 to produce candidate content 218, in accordance with embodiments described herein. The one or more pieces of candidate content 218 can be selected as a set to be utilized for content expansion. In an exemplary embodiment, multiple pieces of candidate content 218 can be both relevant to the input content 202 as well as diverse to one another, to avoid redundancies in the final expanded content.

In some embodiments, the candidate selection engine 216 selects candidate content 218 based on a maximum marginal relevance (MMR) approach (e.g. by learning MMR models) or based on a graph-based ranking model. It will be appreciated that other greedy algorithms may be used, which can include in a non-limited manner, iterative modeling based on optimizing choices at each stage to find a global optimum.

In some embodiments, the candidate selection engine 216 of the content expansion system can identify a first piece of candidate content 218 from the sub-segments based on a degree of relevancy to the input content 202. In some further embodiments, the candidate selection engine 216 of the content expansion system identifies a second piece of candidate content 218 from the segments or sub-segments based on both a degree of relevancy to the input content 202 and a degree of diversity to the first piece of candidate content 218.

In some instances, the candidate selection engine 216 of the content expansion system can remove content segments or sub-segments 214 from the candidate content pool (e.g., potential pieces of candidate content). For instance, if a piece of candidate content 218 is determined, by the candidate selection engine 216, as not relevant to the input content 202, the candidate selection engine 216 can remove the piece from consideration (i.e., the candidate content pool). In other words, the piece will not be identified as candidate content 218 if determined to be irrelevant to the input content 202. Moreover, if the piece of candidate content 218 is not diverse to the input content 202 or another relevant piece of candidate content 218, the candidate selection engine 216 can also remove the piece from consideration. In some instances, if the piece is too short (e.g., below a threshold length, such as five words), the candidate selection engine 130 can further remove the piece from consideration.

Once the candidate content 218 has been identified, a delivery engine 220, such as delivery engine 140 of FIG. 1, can provide the pieces of candidate content 218 for display on a user interface for selective supplementation of the input content 202. For instance, each piece of candidate content can be listed via a user interface, such as user interface 222, and the candidate content delivery system 220 can provide the list in a viewable arrangement adjacent to the input content. In this way, the delivery engine 220 can detect a user input corresponding to any piece of candidate content 218 and, in response, insert the selected piece of candidate content 218 before or after the obtained input content 202. To this end, input content supplementation has been performed and the user has expanded the input content 202 utilizing relevant and diverse content obtained from the content repository and thereafter processed for.

In more detail, and in accordance with some embodiments, once candidate content 218 has been identified by the candidate selection engine 216, the delivery engine 220 can concatenate, integrate, or otherwise combine one or more pieces of candidate content 218 with the input content 202 to provide one or more instances of expanded content in a viewable arrangement (e.g. as a list on a user selection interface 222) for a user to select. In this regard, the content expansion system may provide one or more expanded content options with respect to the input content 202. In some embodiments, an expansion is run with respect to some input content 202, with a desired target length for the expanded content. In those cases, the delivery engine 220 can expand content based on the input content 202 and the identified relevant and diverse candidate content 218.

Figure 3A:
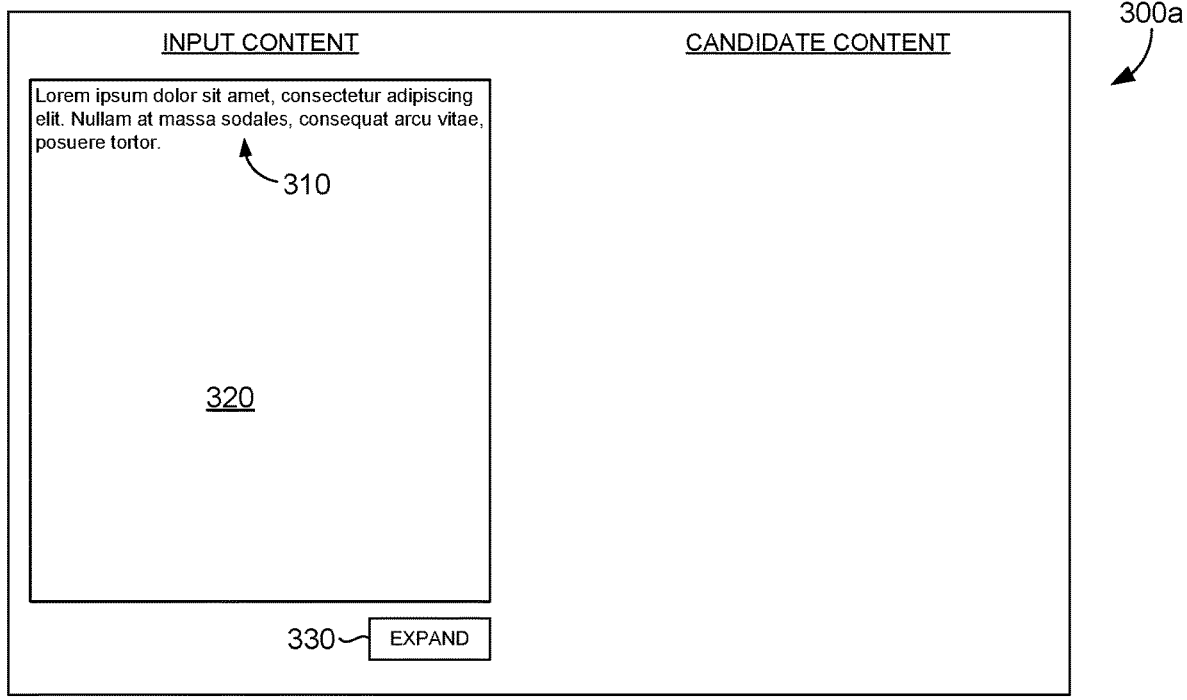
FIG. 3A provides a screen display showing an example user interface for receiving input content, in accordance with some implementations of the present disclosure.

Looking now to FIG. 3A, a screen display showing an example user interface 300a that receives input content 310 from a user for purposes of content expansion is depicted. In other words, input content 310 is received in an input content field 320 as input data. In response to an instruction to initiate content expansion on received input content 320, for instance a user input corresponding to expand button 330, a content expansion process in accordance with embodiments described herein can be initialized.

Figure 3B:
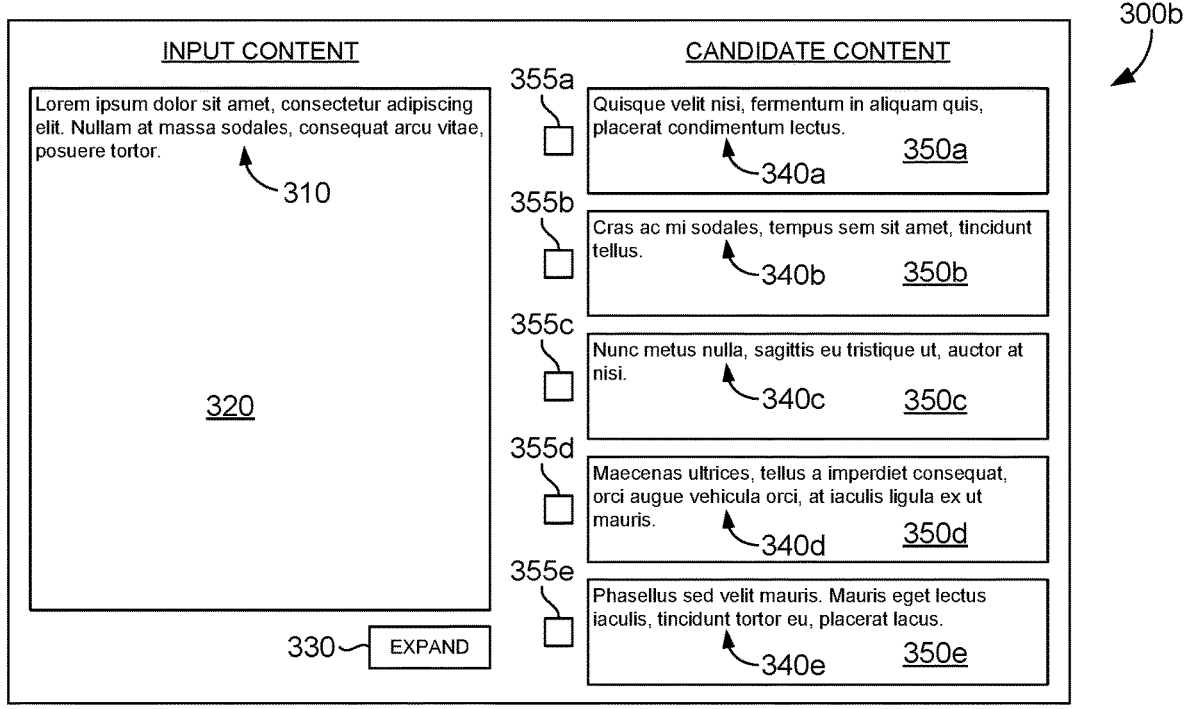
FIG. 3B provides a screen display showing an example user interface for providing for display generated pieces of candidate content, in accordance with some implementations of the present disclosure.

Looking now to FIG. 3B, a screen display showing an exemplary user interface 300b that generates and provides for display one or more proposed pieces of candidate content 340a-340e based on a received input content 310 is depicted. Here, each of the proposed pieces of candidate content 340a-340e is generated and provided for display as selectable portions 350a-350e in response to receiving the instruction to initiate the content expansion on the received input content 320. Each of the proposed pieces of candidate content 340a-340e, provided as selectable portions 350a-350e, is depicted here next to respective selectable checkboxes 355a-355e that can receive a user input to indicate a selection of a corresponding piece of candidate content 340a-340e. Although depicted here as checkboxes 355a-355e, it is contemplated that each portion 350a-350e can be selected with any method known to indicate a selection (e.g., a radio button, a drop down selector, etc.).

Figure 3C:
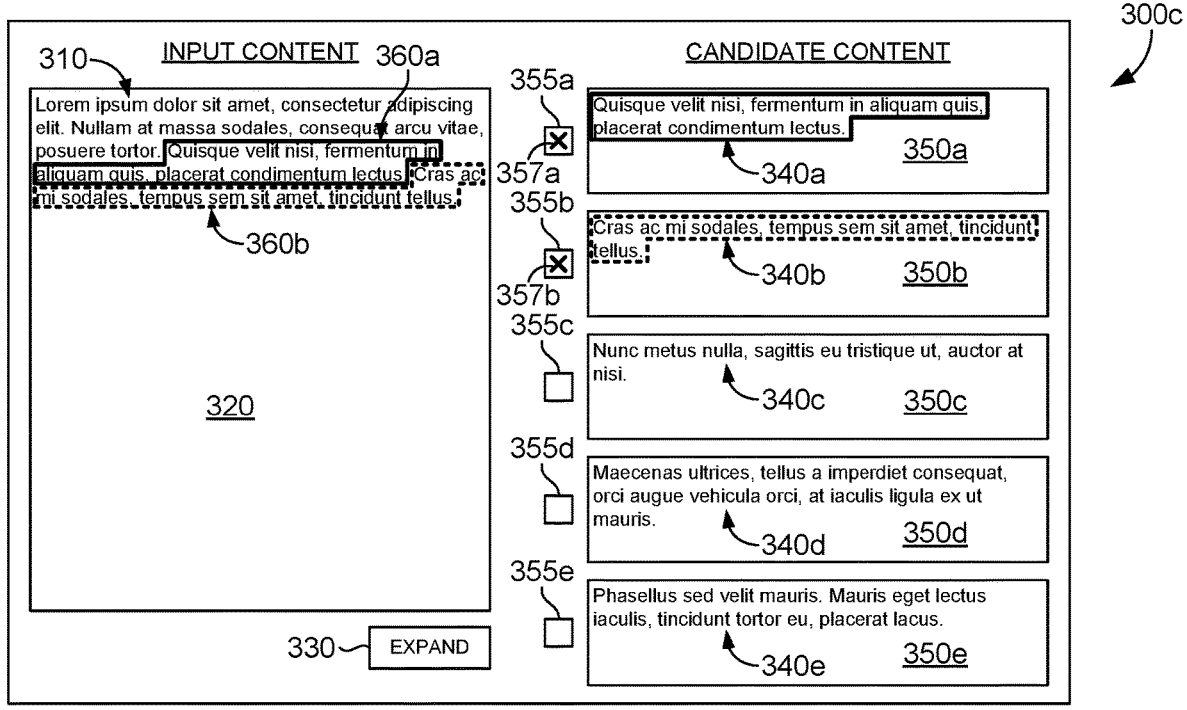
FIG. 3C provides a screen display showing an example user interface for expanding received input content based on user selections, in accordance with some implementations of the present disclosure.

Looking now to FIG. 3C, a screen display showing an exemplary user interface 300c that expands or supplements the received input content 310 based on selected pieces of candidate content 355a, 355b is depicted. Here, two pieces of candidate content 340a, 340b were selected in response to user inputs received in the form of checks 357a, 357b corresponding to checkboxes 355a, 355b. As such, each one of the selectable portions 350a, 350b are selected for expanding the received input content 310. Based on each of the selections received, content expansion is enabled by appending the received input content 310 with each of the selected pieces of candidate content 340a, 340b. The illustrations here are depicted merely as examples and are not intended to be limiting in any way. It is contemplated that formatting and input methods may vary. It is also contemplated that various features can be provided to change the order of selected pieces of candidate content 340a, 340b, or that the expanded input content 310 can be edited, formatted, modified, exported, saved, or any combination thereof, after content expansion on the input content 310 is performed.

As was described with reference to FIGS. 1-2, candidate content can be identified based on relevance scores and diversity. Content segments or sub-segments 214 can be associated with respective relevance scores based upon a relevancy of each segment or sub-segment 214 to the input query 206 or input content 202, and further refined (e.g., deleted from a pool of candidate content segments/sub-segments) based on diversity to one another. Identifying candidate content 218 in accordance with aspects of the present invention that is both relevant and diverse may include the use of modeling or determination algorithms. For example, identifying candidate content 218 can be based on maximum marginal relevance or graph based ranking, as will now be described.

Maximum Marginal Relevance (MMR)

In embodiments according to the present invention, maximum marginal relevance (MMR) may be used to identify and/or select candidate content. By way of non-limiting example only, the content processing engine 120 and/or candidate selection engine 130 can independently or together employ aspects of MMR to identify and/or select candidate content for purposes of content expansion. MMR is an iterative algorithm and in each iteration, the most relevant and diverse pieces of content are selected from a set of given pieces of content by minimizing a cost function given by equation 1 below.

$$\max_{D_i \in R-S} \left[ \lambda score_{relevance} - (1-\lambda) \max_{D_j \in S} (sim(D_i, D_j)) \right]$$

In equation 1, "R" is the set of given content (e.g., relevant content retrieved from a content repository, such as content repository 150 of FIG. 1) and "S" is a subset of content in "R" already selected. "R–S" is thus the set difference or the set of unselected content in R. Score$_{relevance}$ is the relevance score of "$D_i$" for the created query, and "sim($D_i,D_j$)" is the cosine similarity score between the term frequency and inverse document frequency ("TF–IDF") representation of "$D_i$" and "$D_j$", which measures the content overlap via a linear aggregation function. In other words, content overlap (i.e., redundancy) between pieces of relevant content can be measured and thereby minimized, for instance by candidate selection engine 216, to identify candidate content 218.

Graph-Based Ranking

In embodiments according to the present invention, graph-based ranking may also be used to identify and/or select candidate content. By way of another non-limiting example, the content processing engine 120 and/or candidate selection engine 130 can independently or together employ aspects of graph-based ranking to identify and/or select candidate content for purposes of content expansion. Pieces of processed relevant content (e.g., paragraphs, sentences, phrases, etc), such as the relevant content retrieved from the content repository 150 by content retrieval engine 118 and subsequently processed by content processing engine 120 of FIG. 1, can be represented as a node. Further, "$v \in V$" is in a graph "G", which is equal to "(V, E, W)" and the edges "$e \in E$" is the cosine similarity between their "TD–IDF" representations. The relevance of a particular piece of processed relevant content to the query is assigned as a reward "$r_i$" to the corresponding node. The gain "$G_{v_i}$" of including a node "$v_i$" (i.e. piece of processed relevant content) in the expanded content is defined as the weighted summation of the current discounted individual reward values of all the neighbors of "$v_i$."

$$G_{v_i}^l = \Sigma_{V_j \in N_i} r_j^{l-1} w_{ij}$$

$N_i$ is the set of neighboring nodes for $v_i$. A piece of processed relevant content is chosen that yields the maximum gain. Once a given content is selected as a piece of candidate content, the rewards of the neighbor nodes $v_j$ is reduced as:

$$r_j^l = \Sigma_{V_j \in N_i} r_j^{l-1}(1-w_{ij})$$

Accordingly, the reward score of each neighbor of a selected node is its previous reward score multiplied by the amount of its uncaptured similarity with the selected node. Thus, the inclusion of similar pieces of processed relevant content is avoided, so that diversity in the pool of candidate content is accomplished. In various embodiments described herein, the identification and/or selection of candidate content can be an iterative process that can be continued until the length of expanded content exceeds a desired threshold (e.g., 20 sentences, 5 paragraphs, etc.).

Experimental Evaluation

A test on the approaches for content expansion described hereinabove was performed by an automated content expansion system, which is an automated embodiment of the content expansion system 100 described in FIGS. 1-2. That is, the automated content expansion system was configured to automatically identify and select candidate content based on one of the MMR or graph-based ranking approaches, and expand the received input content with the automatically selected candidate content. The input content for the automated content expansion system came from a repository that included two-hundred and fifteen different articles. For the test, thirty different text fragments on various topics, each having between four to eighty-six words (an average of about thirty-three point nine words), were utilized as different pieces of test input content for the automated content expansion system.

Each of the MMR and graph-based ranking approaches were then employed, for instance by the content retrieval engine 118, content processing engine 120, the candidate selection engine 130, or any combination thereof, to expand the test input content to a target length of five-hundred words. That is, testing methods utilized aspects of embodiments described herein to automate the expansion of the input content 105. Input content was provided to the automated content expansion system, relevant content was retrieved (e.g., by content retrieval engine 118) and processed (e.g., by content processing engine 120), and pieces of candidate content were automatically identified and/or selected (e.g., by candidate selection engine 130) to automatically expand the input content based on the various approaches. The MMR approach, as described herein, yielded an average word length of four-hundred and ninety-one point six words. Similarly, the corresponding number for the graph-based ranking approach, as also described herein, was four-hundred and eighty-one point nine words.

Each of the two approaches (i.e., the MMR and graph-based ranking approaches) employed by the automated content expansion system generated a total of sixty expansions. To perform the test, thirty human annotators were tasked to analyze and annotate four of the automatically generated expansions, considering the dimensions of relevance, coherence, and diversity on a scale of zero to seven. In this regard, a total of one-hundred and twenty annotations were collected, with each of the sixty expansions being rated twice while ensuring that the same annotator did not annotate the output from both algorithms.

Figure 4A:
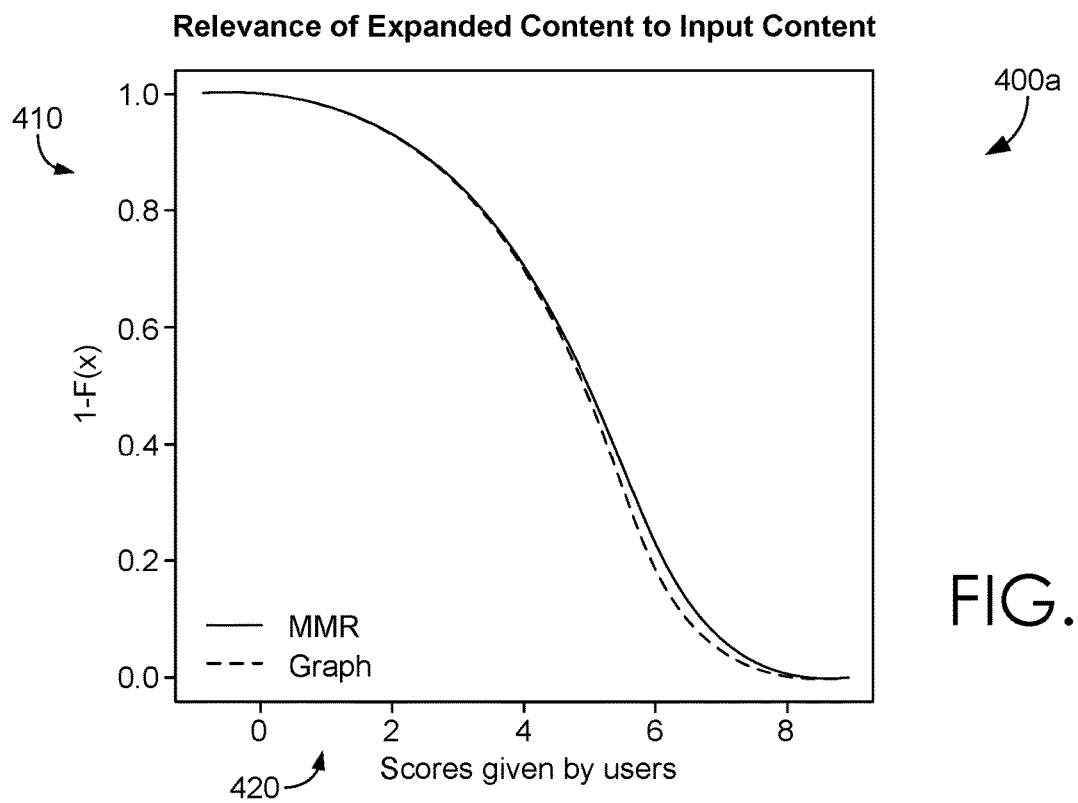
FIGS. 4A-4C provide a series of plot diagrams showing results data, derived in accordance with some implementations of the present disclosure.
Figure 4B:
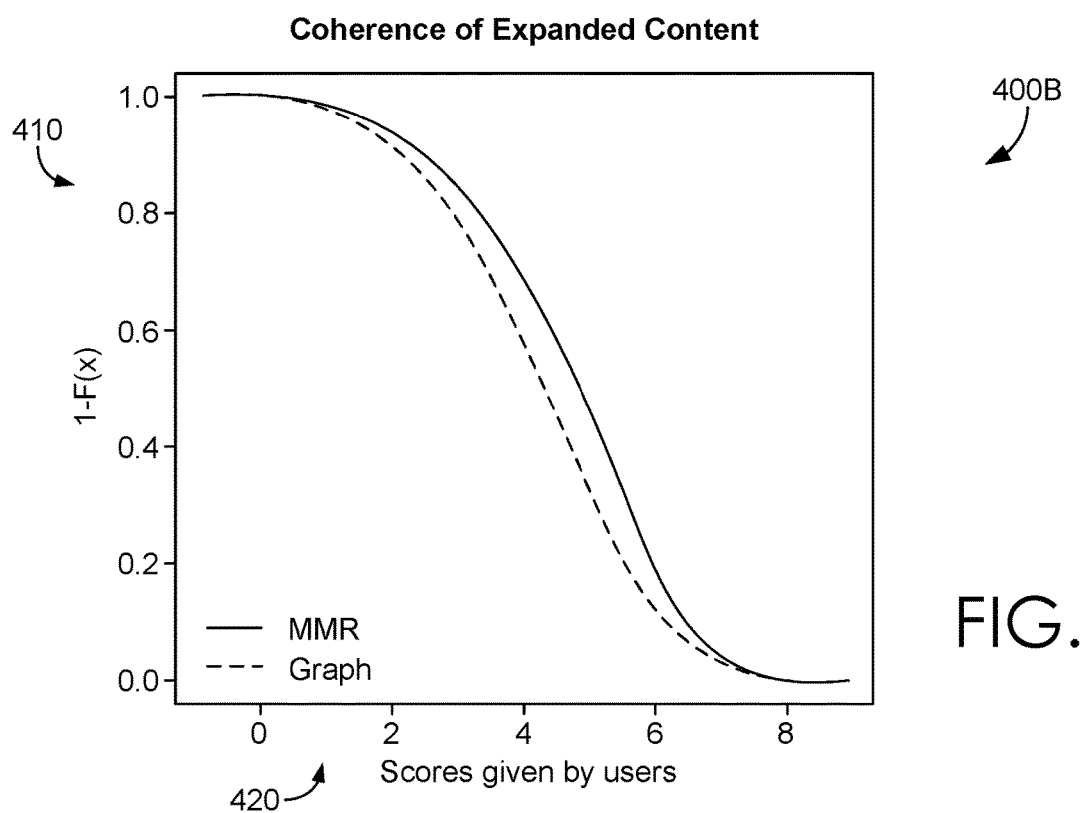
Figure 4C:
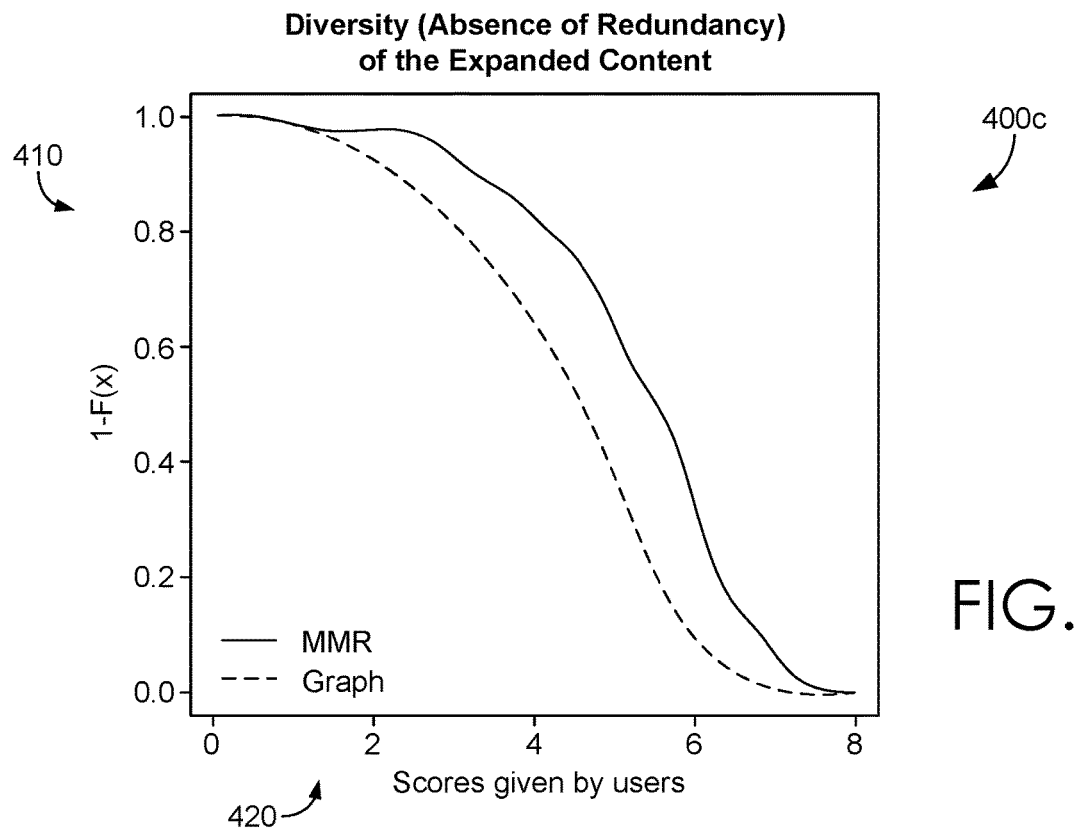

Looking now to FIGS. 4A-4C, diagrams 400a, 400b, 400c illustrating results from the experimental evaluation described above are provided. More specifically, the diagrams 400a, 400b, 400c of FIGS. 4A-4C, respectively, each plot the fraction of times "y" 410 an expansion utilizing the automated content expansion system in accordance with some embodiments described herein received a score of at least "x" 420 for relevance, coherence, and diversity, respectively. That is, the scores 420 relate to how relevant each expansion (i.e., the selected candidate content) is to a received input query, how clearly coherent the expansion is, and how different each piece of candidate content is from the input query and/or one another. Each of the illustrated plots is computed based on the cumulative distribution of the scores based on the kernel density estimates.

With regard to the diagram 400a scoring relevance, the two approaches (i.e., MMR vs. graph) are comparable, which is most likely due to the fact that the same keyword extraction and search process applies for both approaches. Diversity 400c, scored in diagram 400b, was observed to be better for the MMR approach, likely because of its directly optimizing for low content-level overlap in its objective function, along with the choice of λ being close to one. With regard to coherence 400b, scored in diagram 400c, the proposed approaches did not directly maximize the dimension. However, the expansions based on the MMR approach were found to be more coherent from the user ratings. In this instance, the graph method inherently optimizes for maintaining the representativeness of the content repository in the expansion and may be the reason why the MMR approach outperforms the graph-based approach. While the tests show that the MMR approach was found to outperform the graph-based approach, the utilization of MMR is not intended to limit the scope of embodiments described herein. In fact, it is contemplated that any algorithm for determining relevance and/or diversity can but utilized, independently or in combination, and remain within the purview of the present disclosure.

Methods for Expanding Content

Figure 5:
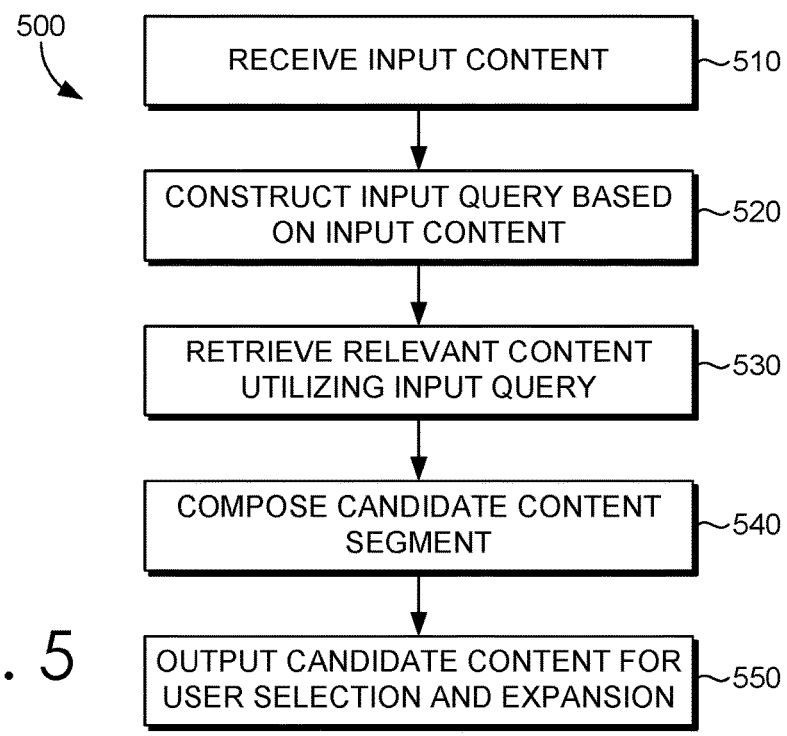

Having described various aspects of the present disclosure, exemplary methods are described below for expanding user input content. Referring to FIG. 5 in light of FIGS. 1-4C, FIG. 5 is a flow diagram showing a method 500 for enabling content expansion. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, input content can be received, for instance, by a user interface of a content expansion system (e.g., content expansion system 300 of FIG. 3). The input content can include characters, words, sentences, paragraphs, phrases, documents, URLs, reference identifiers, and other forms of electronic content or links from which electronic content can be retrieved.

Figure 6:
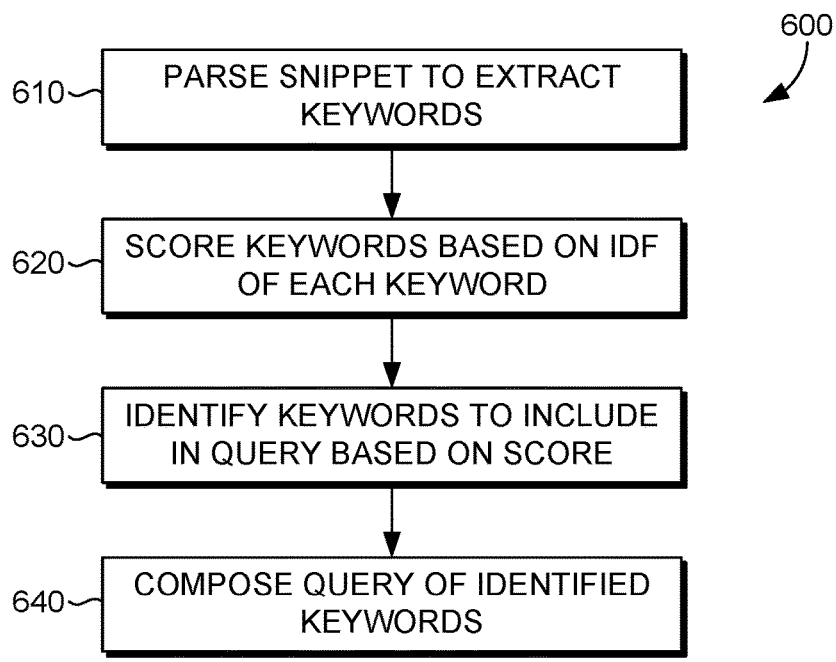

At block 520, an input query can be generated, as will be described in more detail with reference to FIG. 6. For example, an input query can be generated by a query constructor (e.g. query constructor 110 of FIG. 1) in response to user generated input content passed to the content expansion system. The input query can be generated based at least in part on the input content received (e.g., the input content 105 of FIG. 1 that is passed to the system or retrieved by the system). As was described, keywords from the received input content can be identified and ranked based on their importance. For example, a query constructor 110 of FIG. 1 can extract one or more keywords from the input content and rank them based on their IDF score in a repository. Alternatively, for example, a query constructor (e.g. query constructor 110 of FIG. 1) can determine the importance of a particular keyword by referencing a static reference chart. In some embodiments, the query constructor can dynamically generate the input query based on content stored in a content repository (such as content repository 150 of FIG. 1). For instance, in one embodiment, when a particular substantive word is determined not to be a filler word (e.g., and, then, they, what, the, why, are, is, etc.) and is further determined to frequently occur within a repository, the ranking of that substantive word may increase. In further embodiments, the query constructor can base keyword ranking on a combination of a static reference chart and a recurrence of a particular word in order to determine a term's importance ranking. In some other embodiments, the query constructor can determine the importance of various terms utilizing machine learning techniques. Such techniques may employ any combination of static lists, dictionaries, research papers, encyclopedias, previously-authored words in electronic form, and any other form of electronic document (e.g., text documents, PDF documents, Word documents, HTML documents, XML documents, etc.).

At block 530, relevant content can be identified and/or retrieved 530 by processing the generated input query. Processing the generated input query can include initiating a search on a content repository (such as content repository 360 of FIG. 3) that utilizes the generated input query. The search can include identifying pieces of content that are relevant to the generated input query, and in some embodiments, ranking the identified pieces of content based on their determined relevance. In essence, a relevance score can be given to each piece of content that is identified in response to processing the generated input query. The relevance score can be determined based on a likelihood that the content of a particular piece of content is relevant to the generated input query. For example, the query constructor (e.g. query constructor 110 of FIG. 1) can generate an input query, which can comprise of one or more query clauses. The input query can then be passed to the content retrieval engine (e.g. content retrieval engine 118 of FIG. 1) which can generate a relevance score for each document as it searches the content repository (e.g. content repository 150 of FIG. 1). In some embodiments, the relevance score can be determined by calculating how similar one or more words are spelled, as compared to the original input content. In some embodiments, the relevance score can be determined by incorporating a percentage of terms found in the documents with respect to the original input content. In some other embodiments, the relevance score can be calculated based on how similar the contents of a full text field are to a full query clause, i.e. term frequency/inverse document frequency (TF/IDF). In some other embodiments, only pieces of content meeting or exceeding a threshold relevance score can be determined as relevant to the input query.

Figure 7:
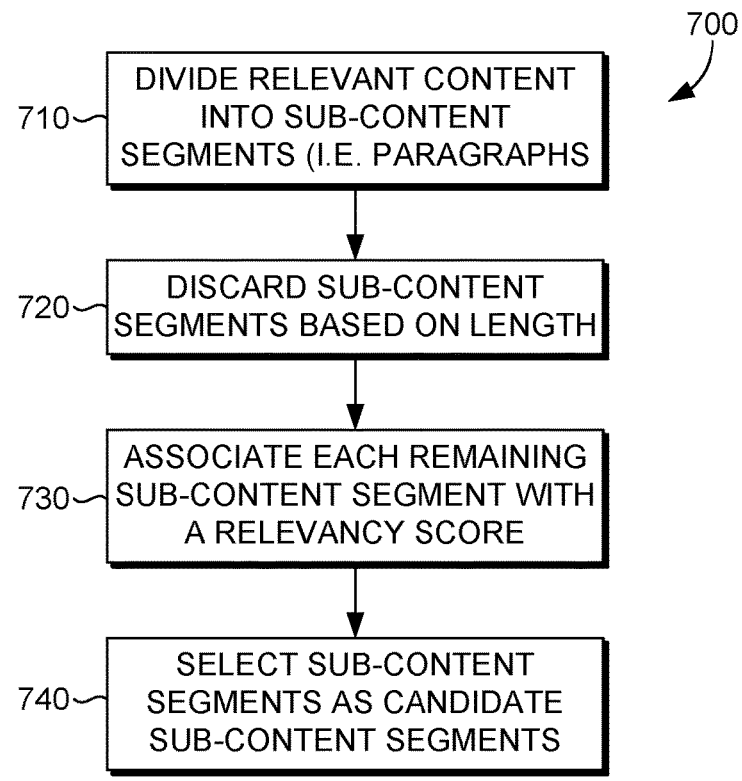

At block 540, a set of candidate content can be composed, as will be described in more detail with reference to FIG. 7. The set of candidate content can include one or more pieces of content segments or sub-segments, which can each comprise smaller portions (e.g., words, sentences, phrases, paragraphs, etc.) of each identified and relevant piece of content. Each segment or sub-segment can be analyzed to determine its diversity from any other segment or sub-segment, and its relevance to the generated input query. As previously described herein, relevant content is identified and retrieved by a content retrieval engine (e.g. content retrieval engine 118 of FIG. 1), which can utilize an input query to identify relevant content in a repository based on relevance scores associated with content in the repository, for instance utilizing TD/IDF determination methods. Relevant content, along with its relevance score to the input query, can then be returned in response to processing of the query. Further, as previously described herein, after the returned content is processed (e.g. by content processing engine 120 of FIG. 1), a candidate selection engine (e.g. 130 of FIG. 1) can identify diverse content utilizing for instance, a greedy algorithm. A desired set of candidate content, including one or more segments or sub-segments that are each relevant and diverse, can then be provided. Once a desired set (e.g., one or more pieces) of candidate content is identified, at block 550, the candidate content can be output to a user for selection and usage in expanding the input content.

Having described various aspects of the present disclosure, exemplary methods are described below for expanding user input content. Referring to FIG. 6 in light of FIGS. 1-4C, FIG. 6 is a flow diagram showing a method 600 for constructing queries for utilization in content expansion. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Construction of a query based upon input content can ensure that appropriate content is identified by the content expansion system. At block 610, input content can be parsed and individual terms can be extracted therefrom. In other words, each term in an input content can be analyzed to determine if it is a keyword that should be analyzed. In some embodiments, filler terms that are generally irrelevant for determining substance or context of content are excluded from consideration as a keyword.

At block 620, the identified keywords can be scored based on an inverse document frequency score determined for each keyword in the repository. In embodiments, keywords can be identified based on a determined importance of a term, for instance by a query constructor 110 of FIG. 1. In various embodiments, keyword importance can be determined by term frequency in one or more documents in a repository, or by inverse document frequency across a set of documents in the repository. In various embodiments, keyword importance can be determined utilizing machine learning processes, static importance lists, presence in the input content, recurrence in the input content, recurrence in a repository, a determined inverse document frequency score, or any combination thereof.

At block 630, the keywords can then be ranked by a query constructor (e.g. query constructor 130 of FIG. 1) such that a degree of importance (e.g., a keyword score) is associated with each keyword. The ranking of the keywords can be based on their degree of importance relative to the input content. That is, the ranked keywords can be ordered based on their relative scores.

At block 640, a query can be composed from the identified keywords, based on their rank. In essence, the identified keywords having a rank value above a particular threshold rank value are determined to be important enough to be included in the input query. In this regard, the input query can then be processed, for instance by a content expansion system in accordance with embodiments described herein, to retrieve relevant content for at least partially supplementing user-provided input content.

Having described various aspects of the present disclosure, exemplary methods are described below for composing candidate content to facilitate content expansion. Referring to FIG. 7 in light of FIGS. 1-4C, FIG. 7 is a flow diagram showing a method 700 for constructing queries for utilization in content expansion. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Candidate content can be composed based on relevant content that has been identified and/or retrieved from a content repository by a content retrieval engine (e.g. 118 of FIG. 1) via an input query. At block 710, identified relevant content can be divided into sub-segments or segments by a content processing engine (e.g. 120 of FIG. 1). Segments or sub-segments can include, for example, paragraphs or sentences, among other things.

At block 720, the pool of content sub-segments or segments can be cleaned by a content processing engine (e.g. 120 of FIG. 1) to generate a refined set of content sub-segments or segments. In other words, any one or more content segments or sub-segments can be removed or discarded from consideration as a piece of candidate content based on a variety of factors, including a comparison to a threshold length, among other things. The threshold length can define a maximum number of characters, words, sentences, paragraphs, and the like. Any content segment or sub-segment not exceeding the threshold length can be eliminated from the pool of consideration.

At block 730, a relevance score can be associated with each remaining content sub-segment or segment by a content processing engine (e.g. content processing engine 120 of FIG. 1), in accordance with embodiments described herein. As described herein, the relevance score can be determined based on any one or more of likeness comparisons, machine learning processes, repository characteristics, and the like. A relevance score, for example, could be the relevance of the content segment or sub-segment to an input query (e.g. input query 206 of FIG. 2). As previously described herein, the relevance score with respect to an input query can be determined by a query constructor (e.g. query constructor 110 of FIG. 1) utilizing IDF scores associated with documents in a content repository (e.g. 150 and 155 of FIG. 1).

At block 740, the pieces of candidate content can be selected from the set of remaining content segments or sub-segments by a candidate selection engine (e.g. candidate selection engine 130 of FIG. 1). The pieces of candidate content can be identified by identifying those segments or sub-segments having significant diversity from other segments. In this manner, a first candidate content can be identified from the relevant content based on a relevancy of the first candidate content to the input content. A second candidate content can then be identified from the relevant content based on a diversity of the second candidate content relative to the first candidate content. In other words, no two segments or sub-segments will be similar or contain similar content. In this way, pieces of candidate content provided for purposes of content expansion can enable non-redundant and relevant content options for supplementing input content provided by the user.

Figure 8:
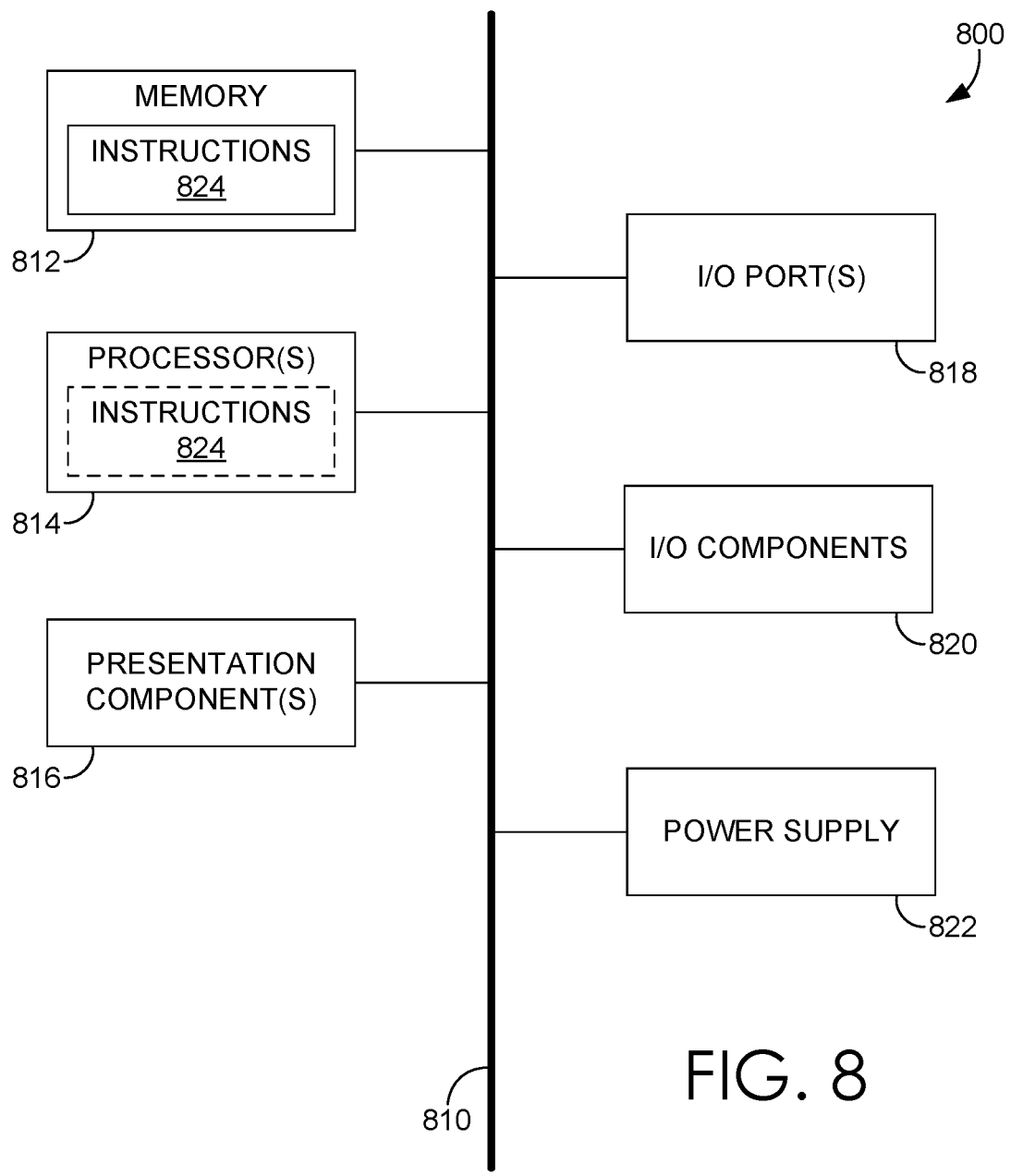

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is merely one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus or combination thereof). Although the various blocks of FIG. 8 are shown with clearly delineated lines for the sake of clarity, in reality, such delineations are not so clear and these lines may overlap. For example, one may consider a presentation component such as a display device to be an I/O component as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 800 typically includes a variety of computer-readable media. Computer-readable media can be any available media that can be accessed by computing device 800, and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or non-volatile memory. As depicted, memory 812 includes instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A computer-implemented method for expanding text-based content, comprising:
receiving, by a computing device, a text-based input via a user interface;
identifying, by the computing device, pieces of relevant text-based content from a repository of previously-generated text-based content based at least in part on the received text-based input;
dividing, by the computing device, the identified pieces into a plurality of sentences;
selecting, by the computing device, a set of candidate sentences from the plurality of sentences, each sentence of the set of candidate sentences being selected based at least in part on a number of words in the sentence, a determined relevancy of the sentence to the received text-based input, and a determined non-redundancy of the sentence relative to other sentences in the set of candidate sentences, wherein the non-redundancy is determined based on a calculated diversity score that corresponds to a degree of overlap between the sentence and other sentences in the set of candidate sentences; and
providing for display, by the computing device, the selected set of candidate sentences, each sentence of the displayed selected set of candidate sentences being independently selectable to expand the received text-based input.

2. The method of claim 1, further comprising:
extracting, by the computing device, keywords from the received text-based input; and
ranking, by the computing device, the extracted keywords based on a degree of importance determined for each extracted keyword, wherein the pieces of relevant text-based content are identified based on the ranked keywords.

3. The method of claim 2, wherein the degree of importance is determined based at least in part on a determined number of times the extracted keyword appears in the repository.

4. The method of claim 2, wherein each piece of content in the pieces of relevant text-based content is identified based at least in part on a calculated relevance score of the piece compared to a defined relevance threshold.

5. The method of claim 1, wherein the relevancy of the sentence to the received text-based input is determined based on a relevance score calculated for the sentence.

6. The method of claim 1, wherein each sentence is selected based further in part on a determined maximum marginal relevance of the sentence and a relative graph-based ranking of the sentence.

7. The method of claim 1, wherein the diversity score further corresponds to another degree of overlap between the paragraph and the received text-based input.

8. At least one computer storage media, having instructions stored thereon that, when executed by at least one processor of a computing system, cause the computing system to:
receive a text-based input via a user interface;
identify, based on at least a portion of the received text-based input, pieces of relevant text-based content from a repository of previously-generated text-based content;
divide the identified pieces of relevant text-based content into a plurality of paragraphs, each paragraph of the plurality of paragraphs being defined in one of the identified pieces of relevant text-based content;
select a set of candidate paragraphs from the plurality of paragraphs, each paragraph in the set of candidate paragraphs being selected based at least in part on a number of sentences in the paragraphs compared to a threshold sentence count, a determined relevancy the sentence to the received text-based input, and a determined non-redundancy of the paragraph relative to other paragraphs in the set of candidate paragraphs, wherein the non-redundancy is determined based on a calculated diversity score that corresponds to a degree of overlap between at least two paragraphs in the set of candidate paragraphs; and
output the selected set of candidate paragraphs for display, each displayed paragraphs of the selected set of candidate paragraphs being selectable to expand the received text-based input.

9. The computer storage media of claim 8, wherein the received text-based input is a sentence.

10. The computer storage media of claim 9, wherein the instructions further cause the system to:
extract keywords from the received text-based input;
generate a keyword score for each extracted keyword based at least in part on a determined number of times the extracted keyword appears in the repository; and
rank the extracted keywords based on their corresponding keyword score, wherein the ranked extracted keywords are employed to determine the relevancy of each paragraph in the plurality of paragraphs.

11. The computer storage media of claim 8, wherein the instructions further cause the system to:
divide each paragraph of the plurality of paragraphs into a corresponding plurality of sentences, and
wherein each candidate paragraph in the set of candidate paragraphs is selected from the plurality of paragraphs based further in part on another determined non-redundancy of sentences in the candidate paragraph.

12. A computerized system comprising:
at least one processor; and
at least one computer storage media storing computer-usable instructions that, when executed by the at least one processor, causes the at least one processor to:
receive a text-based input via a user interface;
identify pieces of text-based content relevant to the received text-based input from at least one repository of previously-generated text-based content based on the received text-based input;
select a set of paragraphs from the identified pieces of relevant text-based content based at least in part on a relevancy score calculated for each paragraph of a plurality of paragraphs defined in the identified pieces of relevant text-based content;

identify a set of candidate paragraphs from the selected set of paragraphs based on a determined non-redundancy of each paragraph relative to other paragraphs in the selected set of paragraphs, wherein the non-redundancy is determined based on a calculated diversity score that corresponds to a degree of overlap between the paragraph and the other paragraphs;

provide for display the identified set of candidate paragraphs, each candidate paragraph of the displayed set of candidate paragraphs being selectable to expand the received text-based input; and generate a piece of new text-based content based on a combination of the received text-based input and at least one paragraph selected from the displayed set of candidate paragraphs.

13. The computerized system of claim 12, wherein each paragraph of the selected set of paragraphs includes a corresponding set of sentences, and wherein each sentence in the corresponding set of sentences determined to have a corresponding length that is less than a predefined threshold word count is removed from the paragraph before the set of candidate paragraphs is identified.

\* \* \* \* \*

UNITED STATES PATENT AND TRADEMARK OFFICE
CERTIFICATE OF CORRECTION

PATENT NO.       : 10,733,359 B2
APPLICATION NO.  : 15/248675
DATED            : August 4, 2020
INVENTOR(S)      : Balaji Vasan Srinivasan et al.

Page 1 of 1

It is certified that error appears in the above-identified patent and that said Letters Patent is hereby corrected as shown below:

In the Claims

In Column 18, Line 21, Claim 8, after "relevancy" insert -- of --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*